US 8,250,527 B1

(12) United States Patent
Gubbay et al.

(10) Patent No.: US 8,250,527 B1
(45) Date of Patent: Aug. 21, 2012

(54) SYSTEM AND METHOD FOR MAINTAINING A STICKY ASSOCIATION OF OPTIMIZATION SETTINGS DEFINED FOR AN IMAGE REFERENCED IN SOFTWARE CODE OF AN APPLICATION BEING AUTHORED

(75) Inventors: Paul Gubbay, Rancho Santa Fe, CA (US); Kenneth Berger, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1299 days.

(21) Appl. No.: 11/948,301

(22) Filed: Nov. 30, 2007

Related U.S. Application Data

(60) Provisional application No. 60/985,949, filed on Nov. 6, 2007.

(51) Int. Cl.
*G06F 9/44* (2006.01)
(52) U.S. Cl. ......... 717/113; 717/111; 717/112; 717/120
(58) Field of Classification Search ........................ None
See application file for complete search history.

(56) References Cited

U.S. PATENT DOCUMENTS

| 2004/0078357 A1* | 4/2004 | LaChapelle et al. ............... 707/2 |
| 2006/0181614 A1* | 8/2006 | Yen et al. .................... 348/222.1 |
| 2006/0200751 A1* | 9/2006 | Underwood et al. ...... 715/501.1 |
| 2006/0218488 A1* | 9/2006 | Shah et al. ..................... 715/516 |
| 2007/0147700 A1* | 6/2007 | Jeong et al. ................... 382/266 |
| 2008/0152260 A1* | 6/2008 | Cheng et al. .................. 382/284 |

OTHER PUBLICATIONS

A transcript of a portion of a presentation made by Greg Rewis at a conference (the "MAX conference") on Oct. 24, 2006.
A complete multimedia recording of the presentations made at the MAX conference on Oct. 24, 2006 and Oct. 25, 2006 is available at http://www.adobe.com/events/max/max2006/video/.
A DVD containing a multimedia recording of the complete presentation made by Greg Rewis on Oct. 24, 2006 at the MAX conference, which is available in the fifth video thumbnail of the "Day 1" presentations at http://www.adobe.com/events/max/max2006/video/.

\* cited by examiner

*Primary Examiner* — Isaac Tecklu
(74) *Attorney, Agent, or Firm* — Kilpatrick Townsend & Stockton LLP

(57) ABSTRACT

Systems and methods maintain a "sticky" association of optimization settings defined for an image referenced in software code of an application being authored. According to one embodiment, a method comprises detecting, by a software code authoring tool, insertion into software code being authored in the authoring tool of a reference to an image. The authoring tool determines whether the detected reference replaces a previously-defined reference to an image in the software code with a reference to a new image. When determined that such a replacement is occurring, the authoring tool determines from data associated with the software code optimization settings for the image referenced in the previously-defined reference being replaced in the software code, and applies the determined optimization settings to the new image.

22 Claims, 11 Drawing Sheets

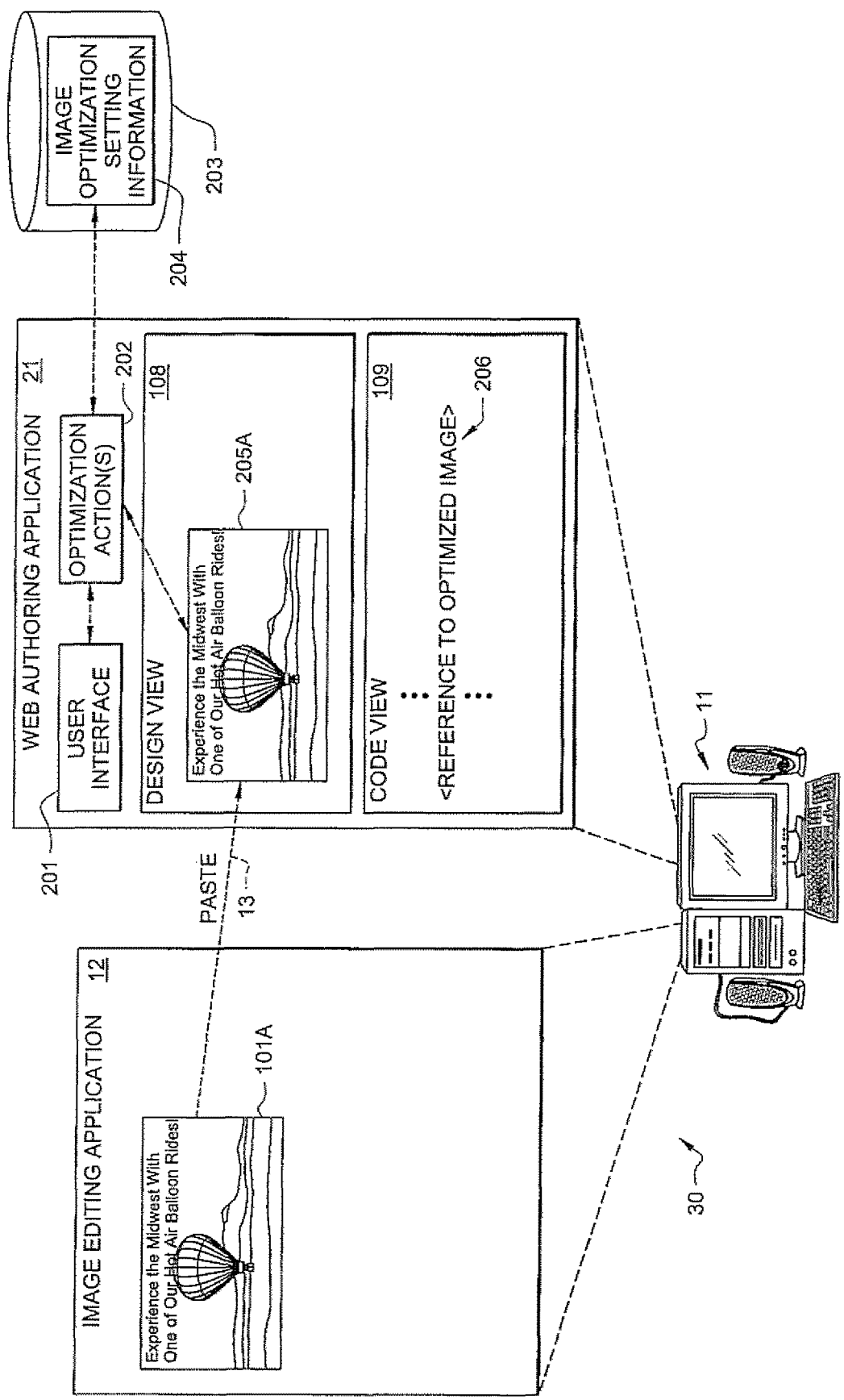

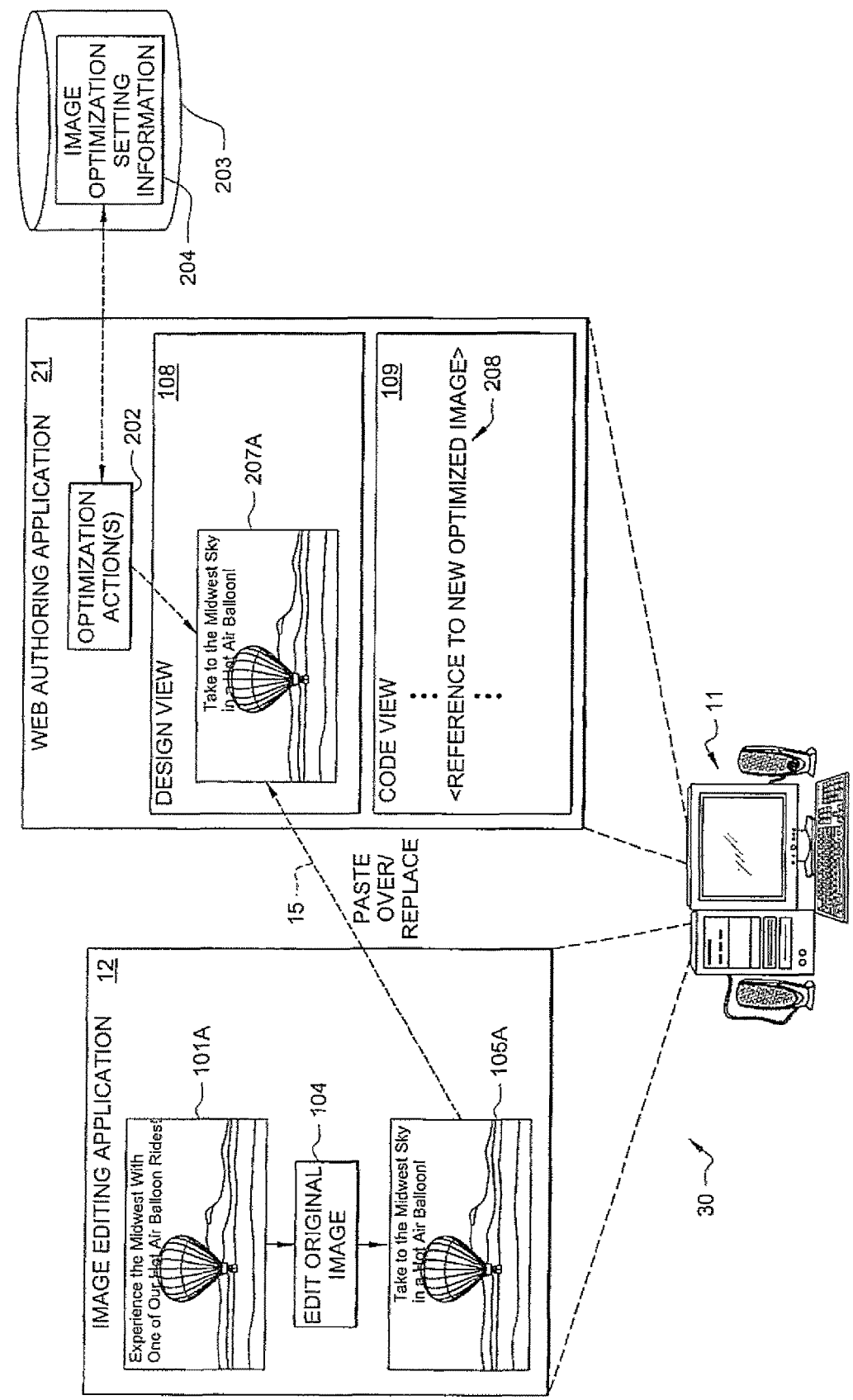

SYSTEM AND METHOD FOR MAINTAINING A STICKY ASSOCIATION OF OPTIMIZATION SETTINGS DEFINED FOR AN IMAGE REFERENCED IN SOFTWARE CODE OF AN APPLICATION BEING AUTHORED

CROSS-REFERENCE TO RELATED APPLICATIONS

This application claims priority from U.S. Provisional Patent Application No. 60/985,949, filed Nov. 6, 2007, the disclosure of which is hereby incorporated by reference herein.

TECHNICAL FIELD

The following description relates generally to software code authoring tools, and more specifically to software code authoring tools that aid in maintaining optimization settings for an image referenced in software code being authored.

BACKGROUND OF THE INVENTION

Many software development tools are available today for use by software designers (or "developers") in creating various types of software applications. Software "designers" and "developers" are used interchangeably herein, and generally refer to anyone involved with using a software development tool for authoring a software application. Authoring may include coding, designing, and/or otherwise creating or modifying the software application. A software application, as used herein, generally refers to any application that may be executed by a processor (or interpreter of some type) in order to perform operations defined by the instructions of the software application, including as an example presenting a user interface to a display. One example of such a software application is a web page, which may be defined in a markup language, such as HTML, XML, etc., JAVA, and/or other underlying code that may be read and interpreted by a browser to generate a corresponding presentation of the web page to a display.

In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing markup language (e.g., HTML, XML, etc.) applications are among the most commonly used.

Thus, IDEs provide software authoring tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is an IDE that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™) and the like.

Many software application authoring tools, as may be provided by an IDE, are available today for use by software developers in creating various types of software applications, including as examples such software code authoring tools as ADOBE® DREAMWEAVER® and MICROSOFT® FRONTPAGE®. Certain authoring tools, such as ADOBE® DREAMWEAVER®, allow a developer to create a document in an environment that includes both a text-based code view and a graphical-based design view. The code view renders the source code (e.g., markup language code) as text in a portion of the screen and allows the developer to see and manipulate the source code in the document file. For example, the developer may write and edit HTML or Cascading Style Sheets (CSS) code in the code view. The design view (or "display view"), on the other hand, is a What You See Is What You Get (WYSIWYG) view of the document that allows the user to visually manipulate the interpreted and graphically laid-out version of the document, such as, for example, by dragging, dropping, cutting, and pasting visual components. For instance, techniques similar to those employed by browsers may be employed for presenting the resulting output (e.g., web page) of the underlying code, wherein the developer may manipulate such output within the design view. As the developer works, changes to the document are reflected in both the code view and the design view.

In many instances, software code being authored within a software code authoring tool references an image that the software application (e.g., web page) being authored is to output. A user may generate and/or edit an image within an image editing application. Various image editing applications are known, such as ADOBE® PHOTOSHOP®, ADOBE® FIREWORKS®, COREL® PAINTER, COREL® PAINT-SHOP PRO, COREL® PHOTO-PAINT, MICROSOFT® DIGITAL IMAGE, MICROSOFT® PAINT, etc. In many instances, an image editing application is used to generate an optimized version of an original, high-quality image, wherein the optimized version is optimized for use in the software application that references it. For instance, various characteristics/settings of an original image may be modified to generate a version of the image that is optimized in some way. For example, such settings of the original image may be modified as the file format (e.g., .gif, jpeg, or other desired file format may be selected), the number of colors that the image contains, an amount of data contained with the original image that may be discarded (e.g., the desired level of quality of the image may be selected), and/or whether the optimized image is to be in color or in black-and-white, as examples. Such settings may be selected so as to generate an optimized version of the image that is optimized for some desired operational feature of the software application (e.g., web page) that references the image, such as to reduce data storage requirements associated with storing the referenced image, to reduce transmission time associated with transmitting the referenced image over a communication network, etc.

Commonly, a developer desires to modify a high-quality original image by discarding some of the data contained in the high-quality original image in order to generate an optimized version of the image that is sufficiently small to be used effectively on a web page. To do so, the developer typically uses an image editing application, such as ADOBE® PHOTOSHOP®, ADOBE® FIREWORKS®, etc., to generate the optimized version of an image. Typically, a developer will perform a "SAVE AS" operation on the high-quality original image to save that image as a new image file that will have optimized settings, thus maintaining the original high-quality image unchanged so that it might be available if desired in the future. For the new image file being saved, the developer can choose various optimization settings, including the file format and other settings that effectively define how high of quality the optimized image should have (e.g., how much data from the high-quality original image should be discarded).

The user may then reference the optimized image in a software application being developed. For instance, the optimized image may be copied from the image editing application and pasted into the design view of a software code authoring tool, wherein the user may arrange the display of the optimized image to be presented by the application under development (e.g., a web page under development). As a result of pasting the optimized image into the design view, the corresponding textual code referencing the optimized image may be automatically generated by the authoring tool within the code view window. Thus, when the textual code is interpreted, such as by a browser, it causes the interpreter (e.g., browser) to output the optimized image as shown in the design view. Of course, in some instances, such as if the developer is working with a software authoring tool that does not provide a design view and/or does not support such pasting of an image in the manner described above, the user may elect to manually type the textual code referencing the optimized image.

Thereafter, if the developer desires to replace the referenced image with a different image, the developer performs the above-described actions for generating a new optimized image (e.g., defining the optimized settings for the new image) and then replaces the reference to the image that is no longer wanted with a reference to the new optimized image. For instance, generally if a modification is desired for the referenced image, such modification is made by working with the original high-quality image within an image editing application. Once the high-quality original image is modified in the manner desired, then an optimized version of the modified original image is generated (e.g., using the above-described SAVE AS operation).

Often, all or a portion of the graphical layout of a software application, such as a web page, is designed within an image editing application using high-quality image(s). That is, a mock-up of the graphical layout of a software application (e.g., web page) may be created within an image editing application. Once the mock-up is created, optimization actions may be performed to generate optimized versions of the high-quality original image(s) forming the mock-up. For instance, the above-described SAVE AS operation may be performed wherein the optimization settings are defined for each of the images in the graphical layout to may be saved as optimized versions. Then, the optimized versions of the image(s) are referenced in the software code of the application, such as by copying and pasting them into the design view window or referencing them in the textual code, as discussed above.

Traditionally, if a change is made within the mock-up to the original high-quality images in the image editing application, the user then repeats the optimization operations to generate a new optimized image and replaces the reference in the software code to reference the new optimized image. That is, if the developer desires to replace a reference to a first optimized image in the software code with a reference to a second image, the developer must perform the optimization actions to again define the desired optimization settings for the second image, even though the optimization settings desired for the second image are typically desired to be the same as those previously defined for the first image. Thus, each time that a referenced image is desired to be replaced with a revised image, the user is required to define the desired optimization settings for the corresponding optimized image, which is undesirably inefficient.

BRIEF SUMMARY OF THE INVENTION

The present invention is directed generally to systems and methods which maintain a "sticky" association of optimization settings defined for an image referenced in software code of an application being authored. The association is referred to as being "sticky" because, as described further hereafter, in the event that the reference to an image is replaced with a reference to another image, the optimization settings may be identified as being applicable to the newly referenced image. Accordingly, in certain embodiments of the present invention, optimization settings for an image referenced in software code of an application being authored are maintained associated with the reference to the image such that if the reference to an initial image is replaced with a reference to a new image the defined optimization settings may be automatically applied to the new image. Of course, in certain embodiments, a software code authoring tool may present an option to a developer to either automatically reapply the optimization settings previously defined for the referenced image being replaced to the replacing image or to choose to re-define new optimization settings for the replacing image. In the event that the developer desires the replacing image to have the same optimization settings as previously defined for the image being replaced (as is often the case), the efficiency of the developer can be greatly improved.

In one embodiment, an image is referenced in software code of an application (such as a web page) being authored in a software code authoring tool (such as a web authoring tool). Optimization settings for the referenced image are maintained associated with the software code of the application. For instance, the software code authoring tool may maintain design notes or other metadata associated with the application being developed, and the authoring tool may maintain in such associated data (e.g., design notes) information identifying the optimization settings for an image referenced in the software code. Accordingly, if the referenced image is replaced with a reference to another image, such as via a paste-over operation, the software code authoring tool is capable of recognizing the optimization settings of the image being replaced and may automatically apply those optimization settings to the new image being referenced. In this way, optimization settings defined for a first referenced image are maintained "sticky" with the occurrence of the image reference in the software code such that if that first referenced image is replaced with a reference to a second image, the optimization settings of the first image may be automatically applied by the software code authoring tool to the second image.

In certain embodiments, the authoring tool may present a user interface with which a user may interact to define optimization settings of an image being referenced by software code being authored in the tool. Thus, in certain embodiments, a developer is not limited to defining optimization settings for an image within an image editing application. For instance, in one embodiment, when an image is initially referenced in software code of an application (e.g., a new image is pasted into the software application's design view window or a new textual reference to an image is created), the authoring tool may detect that optimization settings have not yet been defined for the referenced image, and thus the authoring tool may present a user interface with which a user may interact to define optimization settings for the image. The optimization settings that may be defined may include such settings as the file format (e.g., .gif, .jpeg, or other desired file format), the number of colors that the image contains, an amount of data contained with the original image that may be discarded (e.g., the desired level of quality of the image may be selected), and/or whether the optimized image is to be in color or in black-and-white, as examples. Such settings may be selected by the developer through interaction with the software code authoring tool so as to generate an optimized version of the image that is optimized for some desired operational feature of the software application (e.g., web page) that references the image, such as to reduce data storage requirements associated with storing the referenced image, to reduce transmission time associated with transmitting the referenced image over a communication network, etc. Thereafter, once the optimization settings are defined for the referenced image, those optimization settings are maintained "sticky" with the image reference in the software code such that if that reference to the image is replaced with a reference to another image, the optimization settings of the image being replaced may be automatically applied to the newly referenced image.

In one embodiment, the software code authoring tool is a web page authoring tool, such as DREAMWEAVER, etc., and the software application being authored is a web page. For instance, HTML, XML, JAVA, and/or other software code may be used within the web page authoring tool for developing a web page. An image may be referenced in the software code of the web page such that the referenced image is presented in the web page. Optimization settings may be defined for the referenced image (e.g., via a user interface of the web page authoring tool), and such optimization settings are maintained "sticky" with the referenced image by the authoring tool. For instance, the authoring tool may maintain design notes associated with the web page being authored, wherein the authoring tool may include information in the design notes specifying the optimization settings for images referenced in the code being authored. In this way, if the reference in the code to a first image is replaced with a reference to a new image, the optimization settings of the image being replaced may be automatically applied by the web page authoring tool to the newly-referenced image.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 3A-3B show an illustrative example of the exemplary embodiment of FIGS. 2A-2B;

DETAILED DESCRIPTION OF THE INVENTION

Figure 1:
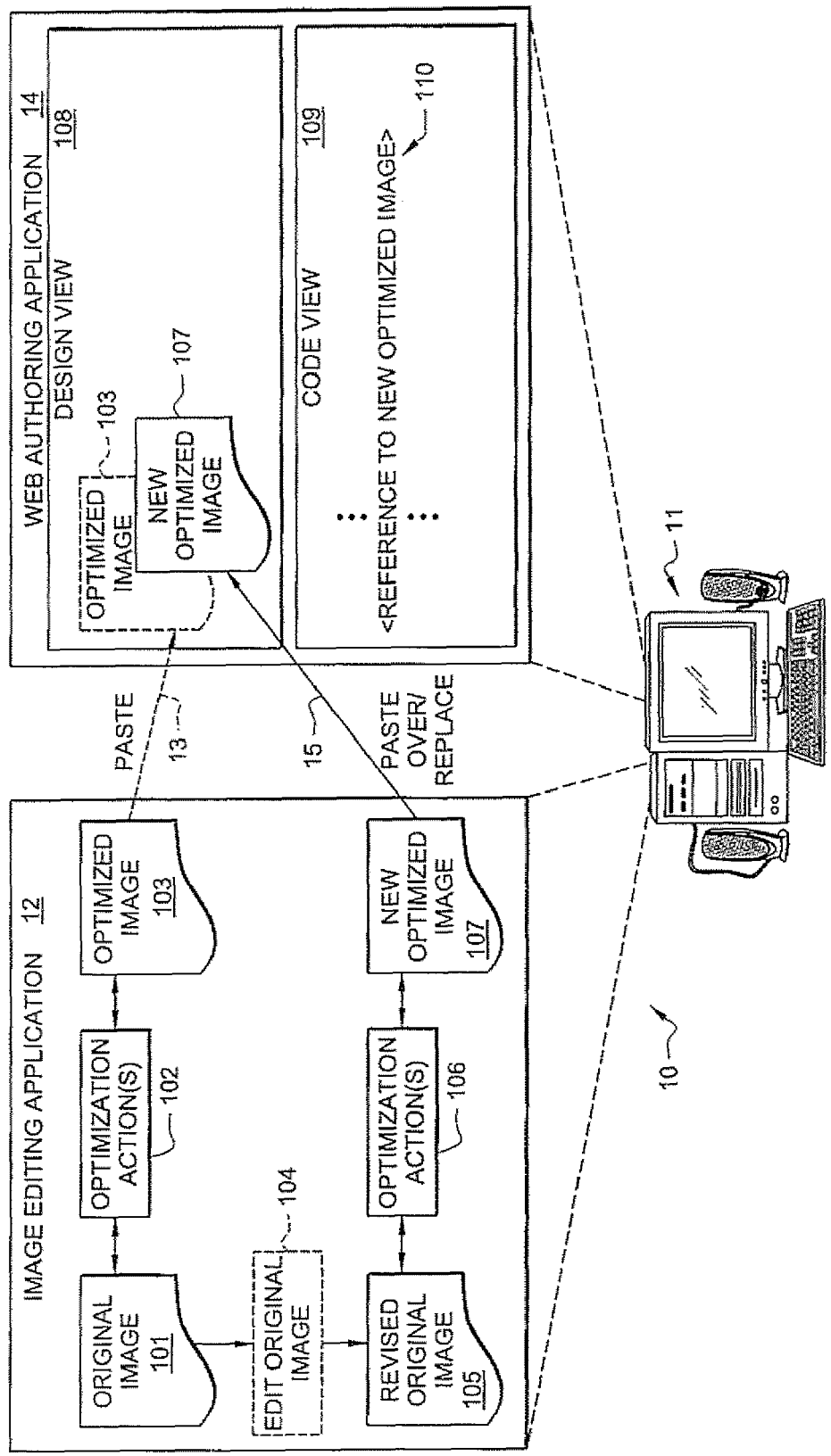
FIG. 1 shows an exemplary system illustrating a common coding technique of the prior art.

Turning to FIG. 1, an exemplary system 10 illustrating a common coding technique of the prior art is shown. As shown, system 10 comprises a processor-based computer 11, such as a personal computer (PC), laptop computer, server computer, workstation computer, etc. In this example, an image editing application 12 and a web authoring tool 14 are executing on such a computer 11. Image editing application 12 comprises computer-executable software code stored to a computer-readable medium that is readable by a processor of computer 11 and, when executed by such processor, causes computer 11 to perform the various operations described further herein for such image editing application 12. Examples of such an image editing application 12 include ADOBE® PHOTOSHOP®, ADOBE® FIREWORKS®, COREL® PAINTER, COREL® PAINTSHOP PRO, COREL® PHOTO-PAINT, MICROSOFT® DIGITAL IMAGE, MICROSOFT® PAINT, etc. Similarly, web page authoring tool 14 comprises computer-executable software code stored to a computer-readable medium that is readable by a processor of computer 11 and, when executed by such processor, causes computer 11 to perform the various operations described further herein. Authoring tool 14 may be part of an IDE, such as DREAMWEAVER®, available from Adobe Systems Incorporated, and FRONTPAGE®, available from Microsoft Corporation, as examples.

Authoring tool 14 may enable development of software code for web pages (e.g., as is commonly coded using such authoring tools as those included in DREAMWEAVER® and FRONTPAGE® mentioned above). Authoring tool 14 may be used to instead, or additionally, develop other software code, such as code for multimedia and application players (e.g., as is commonly coded using such authoring tools as FLEX or FLASH for developing multimedia applications to be executed by the FLASH media player available from Adobe Systems Incorporated). In many cases, such authoring tool 14 enables an author to create textual code that defines a graphical presentation format to be generated by outputting application (e.g., a web page output by a browser, multimedia content output by the Flash player, etc.).

In this example, authoring tool 14 is operable to present one or more user interfaces with which a user (e.g., developer) may interact to author a document, such as a code document that defines a web page to be generated when read/interpreted by a browser. In this example, authoring tool 14 presents a display view (or "design view") interface 108 and a code view interface 109. Authoring tool 14 may employ technology similar to that employed by browsers to read a code document (e.g., of code view 109) and display in design view 108 the corresponding page that is generated from such code. Accordingly, such design view 108 may provide developers the ability to view and edit a web page in a visual mode in which the underlying code (e.g., HTML code, XML code, CSS code, etc.) has been rendered, as if on a web browser. While the developer works on the rendered objects, the authoring tool 14 may translate and effect those changes in the underlying textual code document. Such a display view 108 is a known interface that is available in certain authoring tools, such as in DREAMWEAVER®, available from Adobe Systems Incorporated.

In contrast, code view 109 provides a simple text editor in which the actual textual code (e.g., HTML code, XML code, CSS code, etc.) defining a page to be generated is displayed to the user. Thus, code view 109 shows the textual code that defines the page to be generated when such code is read/interpreted (e.g., by a browser), while display view 108 shows the resulting generated page that is rendered when the underlying code is read/interpreted (e.g., by a browser).

In many instances, software code being authored within a software code authoring tool references an image that the software application (e.g., web page) being authored is to output. For instance, a developer may desire to include within a web page being authored in web authoring application 14 a reference to an image that is to be presented on the web page. A user may generate and/or edit such an image within image editing application 12. In many instances, image editing application 12 is used to generate an optimized version of an original, high-quality image, wherein the optimized version is optimized for use in a software application (e.g., web page) that references it. In the illustrated example of FIG. 1, an original, high-quality image 101 is loaded in image editing application 12. Optimization action(s) 102 may be performed to generate an optimized version 103 of the image. For instance, various characteristics/settings of the original image 101 may be modified to generate version 103 of the image that is optimized in some way.

Commonly, a developer desires to modify a high-quality original image 101 by discarding some of the data contained in the high-quality original image 101 in order to generate optimized version 103 of the image that is sufficiently small to be used effectively on a web page being authored in web authoring application 14. To do so, a developer will typically perform a "SAVE AS" operation in image editing application 12 on the high-quality original image 101 to save that image 101 as a new image file 103 that will have optimized settings, thus maintaining the original high-quality image 101 unchanged so that it might be available if desired in the future. For the new image file 103 being saved, the developer can choose (in optimization actions 102) various optimization settings, including the file format and other settings that effectively define how high of quality the optimized image 103 should have (e.g., how much data from the high-quality original image 101 should be discarded).

The developer may then reference the optimized image 103 in the software application (e.g., web page in this example) being developed in web authoring tool 14. For instance, as shown in the illustrative example of FIG. 1, the optimized image 103 may be copied from the image editing application 12 and pasted (via operation 13) into the design view 108 of authoring tool 14. As a result of pasting the optimized image 103 into the design view 108, the corresponding textual code (not shown) referencing the optimized image 103 may be automatically generated by the authoring tool 14 within the code view window 109. Thus, when the textual code is interpreted, such as by a browser, it causes the interpreter (e.g., browser) to output the optimized image 103 as shown in the design view 108. Of course, in some instances, such as if the developer is working with a software authoring tool 14 that does not provide a design view 108 and/or does not support such pasting 13 of an image in the manner described above, the developer may elect to manually type the textual code in code view 109 for referencing the optimized image 103.

Thereafter, if the developer desires to modify the image, the developer typically makes such a modification by working with the original high-quality image 101 within image editing application 12. For instance, in the illustrative example of FIG. 1, the developer may perform editing operations 104 to modify original image 101, thus resulting in a revised original, high-quality image 105. Then, an optimized version of the revised original image 105 is generated. That is, a developer will typically again perform a "SAVE AS" operation in image editing application 12 on the high-quality revised original image 105 to save that revised image 105 as a new image file 107 that will have optimized settings, thus maintaining the original high-quality image 105 unchanged so that it might be available if desired in the future. For the new image file 107 being saved, the developer again chooses (in optimization actions 106) various optimization settings, including the file format and other settings that effectively define how high of quality the optimized image 107 should have (e.g., how much data from the high-quality original image 105 should be discarded).

The developer may then replace, in the web page being developed in authoring tool 14, the reference to the optimized image 103 with a reference to the new optimized image 107. For instance, as shown in the illustrative example of FIG. 1, the new optimized image 107 may be copied from the image editing application 12 and pasted (via operation 15) over optimized image 103 in the design view 108 of authoring tool 14. That is, optimized image 103 may be selected and a "paste-over" operation may be performed to replace such optimized image 103 with the new optimized image 107. As a result of pasting the new optimized image 107 over the optimized image 103 in the design view 108, the corresponding textual code 110 referencing the new optimized image 107 may be automatically generated by the authoring tool 14 within the code view window 109. Thus, when the textual code is interpreted, such as by a browser, it causes the interpreter (e.g., browser) to output the new optimized image 107 as shown in the design view 108. Again, in some instances, such as if the developer is working with a software authoring tool 14 that does not provide a design view 108 and/or does not support such pasting 15 of an image in the manner described above, the developer may elect to manually type the textual code in code view 109 for replacing the reference to optimized image 103 with a reference to new optimized image 107.

Thus, traditionally, if a change is desired for a referenced image in a software application, the developer is required to repeat the optimization operations (e.g., operations 102 and 106) to generate the new optimized image 107. That is, if the developer desires to replace a reference to a first optimized image 103 in the web page with a reference to a second image 107, the developer must perform the optimization actions 106 to again define the desired optimization settings for the second image 107, even though the optimization settings desired for the second image 107 are typically desired to be the same as those previously defined for the first image 103 (e.g., in optimization actions 102). Thus, each time that a referenced image is desired to be replaced with a revised image, the developer is required to define the desired optimization settings for the corresponding optimized image, which is undesirably inefficient.

Embodiments of the present invention are directed generally to systems and methods which maintain a "sticky" association of optimization settings defined for an image referenced in software code of an application being authored. The association is referred to as being "sticky" because, as described further hereafter, in the event that the reference to an image is replaced with a reference to another image, the optimization settings may be identified as being applicable to the newly referenced image. Accordingly, in certain embodiments of the present invention, optimization settings for an image referenced in software code of an application being authored are maintained associated with the reference to the image such that if the reference to an initial image is replaced with a reference to a new image the defined optimization settings may be automatically applied to the new image. Of course, in certain embodiments, a software code authoring tool may present an option to a developer to either automatically reapply the optimization settings previously defined for the referenced image being replaced to the replacing image or to choose to re-define new optimization settings for the replacing image. In the event that the developer desires the replacing image to have the same optimization settings as previously defined for the image being replaced (as is often the case), the efficiency of the developer can be greatly improved.

Figure 2A:
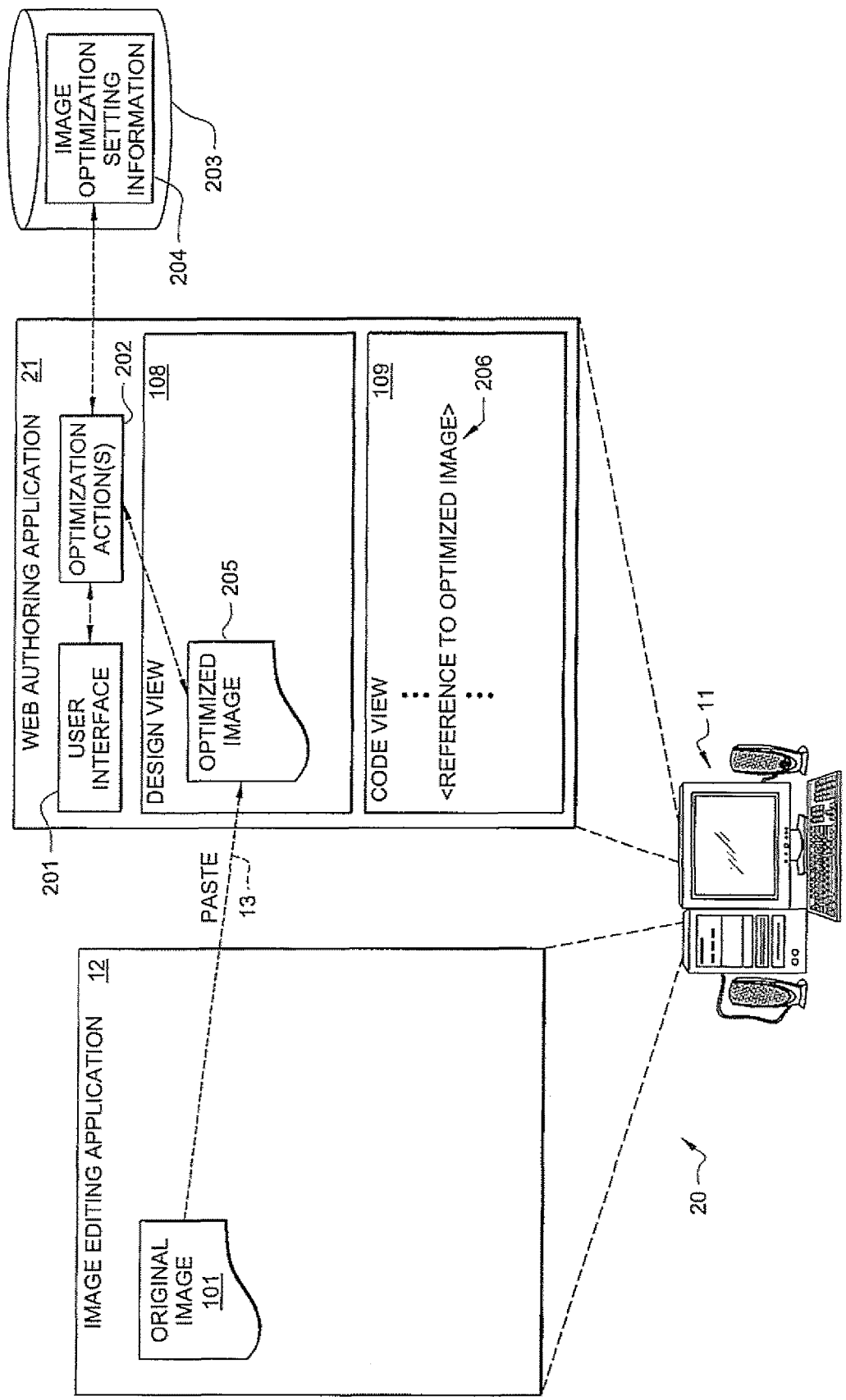
FIGS. 2A-2B show an exemplary system illustrating aspects of one embodiment of the present invention.
Figure 2B:
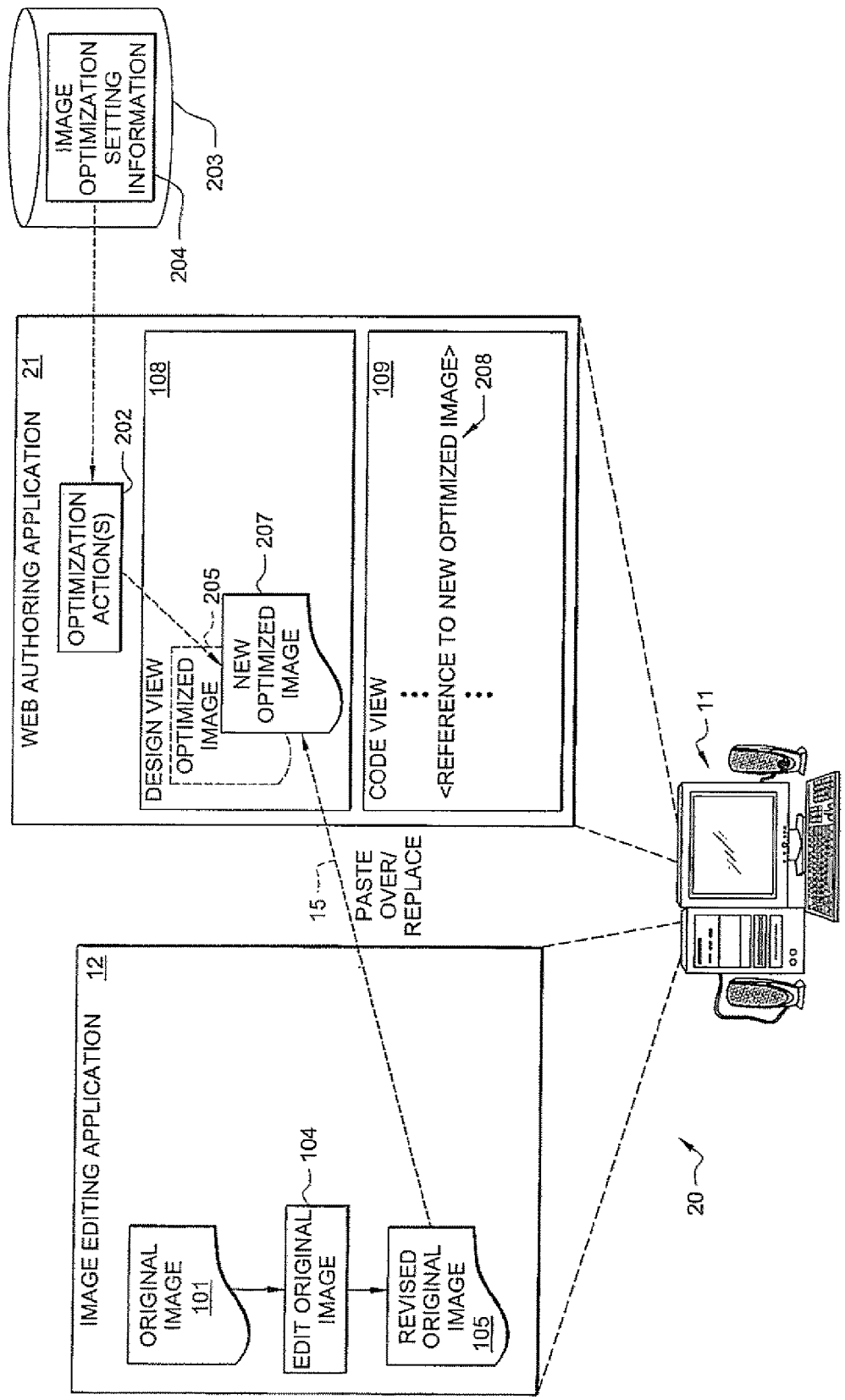

Turning to FIGS. 2A-2B, an exemplary system 20 illustrating aspects of one embodiment of the present invention is shown. As shown, system 20 comprises a processor-based computer 11, such as a personal computer (PC), laptop computer, server computer, workstation computer, etc. In this example, an image editing application 12 and a software code authoring tool 21 are executing on such a computer 11. In the illustrated example, the software code authoring tool 21 is a web authoring tool, such as DREAMWEAVER, but it may be any other software code authoring tool in other embodiments. Additionally, while image editing application 12 and web authoring application 21 are shown as executing on computer 11 for ease of illustration in FIG. 2, it should be recognized that one or both of such applications may be residing and/or executing either locally on computer 11 or on a remote computer to which computer 11 is communicatively coupled via a communication network, such as a local area network (LAN), the Internet or other wide area network (WAN), etc.

As with the example of FIG. 1 described above, image editing application 12 comprises computer-executable software code stored to a computer-readable medium that is readable by a processor of computer 11 and, when executed by such processor, causes computer 11 to perform the various operations described further herein for such image editing application 12. Examples of such an image editing application 12 include ADOBE® PHOTOSHOP®, ADOBE® FIREWORKS®, COREL® PAINTER, COREL® PAINTSHOP PRO, COREL® PHOTO-PAINT, MICROSOFT® DIGITAL IMAGE, MICROSOFT® PAINT, etc. Similarly, web page authoring tool 21 comprises computer-executable software code stored to a computer-readable medium that is readable by a processor of computer 11 and, when executed by such processor, causes computer 11 to perform the various operations described further herein. Authoring tool 21 may be part of an IDE, such as DREAMWEAVER®, available from Adobe Systems Incorporated, and FRONTPAGE®, available from Microsoft Corporation, as examples.

As with the example of FIG. 1, authoring tool 21 may enable development of software code for web pages (e.g., as is commonly coded using such authoring tools as those included in DREAMWEAVER® and FRONTPAGE® mentioned above). Authoring tool 21 may be used to instead, or additionally, develop other software code, such as code for multimedia and application players (e.g., as is commonly coded using such authoring tools as FLEX or FLASH for developing multimedia applications to be executed by the FLASH media player available from Adobe Systems Incorporated). In many cases, such authoring tool 21 enables an author to create textual code that defines a graphical presentation format to be generated by outputting application (e.g., a web page output by a browser, multimedia content output by the Flash player, etc.).

In this example, as with the above example of FIG. 1, authoring tool 21 is operable to present one or more user interfaces with which a user (e.g., developer) may interact to author a document, such as a code document that defines a web page to be generated when read/interpreted by a browser. In this example, authoring tool 21 again presents a display view (or "design view") interface 108 and a code view interface 109, such as described above with FIG. 1.

As discussed above, in many instances, software code being authored within a software code authoring tool references an image that the software application (e.g., web page) being authored is to output. For instance, a developer may desire to include within, a web page being authored in web authoring application 21 a reference to an image that is to be presented on the web page. A user may generate and/or edit such an image within image editing application 12. In the illustrated example of FIG. 2A, an original, high-quality image 101 is generated and/or loaded in image editing application 12.

In this example, a reference to the high-quality image 101 (or some selected portion thereof) may then be made in the code of the application (e.g., web page) being authored in web authoring tool 21. For instance, a developer may select original image 101 (or some portion thereof) and copy and paste (via operation 13) such image 101 from the image editing application 12 into the design view 108 of authoring tool 21. As a result of pasting the image 101 into the design view 108, the corresponding textual code 206 referencing the image may be automatically generated by the authoring tool 21 within the code view window 109. Of course, rather than performing such a paste operation 13, the developer may otherwise reference the image 101, such as by manually typing the textual code reference 206 in code view 109.

According to this exemplary embodiment of the present invention, authoring tool 21 recognizes that the insertion is a new reference to an image, and may thus present a user interface 201 providing the developer with an opportunity to define optimization settings for the referenced image. For instance, the developer may interact with the user interface 201 to perform optimization action(s) 202 to generate an optimized version 205 of the image. Thus, various characteristics/settings of the original image 101 may be modified to generate version 205 of the image that is optimized in some way. As mentioned above, commonly a developer desires to modify a high-quality original image 101 by discarding some of the data contained in the high-quality original image 101 in order to generate optimized version 205 of the image that is sufficiently small to be used effectively on a web page being authored in web authoring application 21. Thus, user interface 201 may enable the developer to choose (in optimization actions 202) various optimization settings, including the file format and other settings that effectively define how high of quality the optimized image 205 should have (e.g., how much data from the high-quality original image 101 should be discarded).

Once the optimization settings are defined, information 204 identifying the optimization settings for the referenced image 205 are stored in computer-readable storage 203. In certain embodiments, information 204 is stored in design notes or other metadata that is associated with the application (e.g., web page) being authored. Accordingly, if the referenced image 205 (referenced in textual code 206) is replaced with a reference to another image, such as via a paste-over operation, the software code authoring tool 21 is capable of recognizing the optimization settings of the image 205 being replaced and may automatically apply those optimization settings to the new image being referenced. In this way, optimization settings defined for a first referenced image 205 are maintained "sticky" with the occurrence of the image reference (e.g., reference 206) in the software code such that if that first referenced image 205 is replaced with a reference to a second image, the optimization settings of the first image 205 may be automatically applied by the software code authoring tool 21 to the second image.

In one embodiment, when an image is pasted into a web authoring tool 21 (e.g., DREAMWEAVER) an image editing application's library (e.g., a FIREWORKS library) is invoked to invoke the optimization process. This appears to the user as a dialog box 201. The options that the user inputs for the optimization settings (including the location of the output file) are stored in the design notes 204 section of the web page in the authoring tool 21. As one example, a proprietary format of design notes is provided for DREAMWEAVER where information can be stored. One design note is associated with each open web page in DREAMWEAVER.

FIG. 2B shows an example in which the developer desires to replace the reference to image 205 with a reference to another image. For instance, the developer may desire to modify the referenced image 205, wherein the developer typically makes such a modification by working with the original high-quality image 101 within image editing application 12. For instance, in the illustrative example of FIG. 2B, the developer may perform editing operations 104 to modify original image 101, thus resulting in a revised original, high-quality image 105. Then, a paste-over (or other replace operation) 15 may be performed to replace the reference to optimized image 205 with a reference to the newly revised original image 105. As a result of past-over operation 15 of the image 105 into the design view 108 to replace the image 205, the corresponding textual code 206 (of FIG. 2A) referencing the image 205 that is being replaced may be automatically replaced with textual code 208 generated by the authoring tool 21 for referencing the new optimized image 207. Of course, rather than performing such a paste-over operation 15, the developer may otherwise replace the textual code 206 (FIG. 2A) referencing image 205 with textual code 208 to the new revised original image 105 in code view 109.

In this exemplary embodiment, authoring tool 21 recognizes that the reference to optimized image 205 is being replaced with a reference to another image (i.e., revised image 105), and thus authoring tool 21 may recall the optimization settings from information 204 that were previously defined for the image 205 that is being replaced and may automatically apply those optimization settings to the newly referenced image 105, resulting in new optimized image 207 being referenced. That is, the optimization settings previously defined for optimized image 205 may be applied to the referenced revised image 105, thus resulting in a reference in the web page to the optimized image 207 (i.e., optimized image 207 is revised image 105 with the optimization settings applied thereto). Of course, in certain embodiments, authoring tool 21 may present an option to a developer to either automatically reapply the optimization settings previously defined for the referenced image 205 being replaced to the replacing image 207 or to choose to re-define new optimization settings (e.g., using user interface 201 of FIG. 2A) for the replacing image 207. In the event that the developer desires the replacing image 207 to have the same optimization settings as previously defined for the image 205 being replaced (as is often the case), the efficiency of the developer can be greatly improved.

Turning to FIGS. 3A-3B, an illustrative example of the above-described embodiment of the present invention is described. In FIG. 3A, exemplary system 30 is shown, which comprises processor-based computer 11, such in FIGS. 2A-2B discussed above. Also, as discussed with FIGS. 2A-2B above, an image editing application 12 and web authoring application 21 are again provided. In the illustrated example of FIG. 3A, an illustrative example of an original, high-quality image 101A is generated and/or loaded in image editing application 12. In this example, such image 101A shows an image of a hot air balloon with a caption "Experience the Midwest with one of our Hot Air Balloon Rides!". Such image 101A may be referenced in a web page being authored in web authoring tool 21 in the manner described above with FIG. 2A. For instance, a past operation 13 may be performed to paste the image 101A into design view 108, whereby corresponding textual code 206 referencing the image is generated in code view 109. As described above with FIG. 2A, web authoring tool 21 may detect that this is a new reference to an image, and may thus present a user interface 201 that enables a developer to perform optimization action (s) 202 to define optimization settings for the image 101A, thus resulting in optimized image 205A being referenced in the web page. And, the optimization, settings defined for the image 205A may stored as information 204, such as in design notes or other metadata associated with the web page being authored.

FIG. 3B shows an example in which the developer desires to replace the reference to image 205A with a reference to another image. For instance, the developer may desire to modify the referenced image 205A, wherein the developer typically makes such a modification by working with the original high-quality image 101A within image editing application 12. For instance, in the illustrative example of FIG. 3B, the developer may perform editing operations 104 to modify original image 101A by changing its caption to read "Take to the Midwest Sky in a Hot Air Balloon!", as shown in the resulting revised original, high-quality image 105A. Then, a paste-over (or other replace operation) 15 may be performed to replace the reference to optimized image 205A with a reference to the newly revised original image 105A, in the manner discussed above with FIG. 2B. As discussed above, authoring tool 21 recognizes that the reference to optimized image 205A is being replaced with a reference to another image (i.e., revised image 105A), and thus authoring tool 21 may recall the optimization settings from information 204 that were previously defined for the image 205A that is being replaced and may automatically apply those optimization settings to the newly referenced image 105A, resulting in new optimized image 207A being referenced, in the manner discussed above with FIG. 2B.

Figure 4:
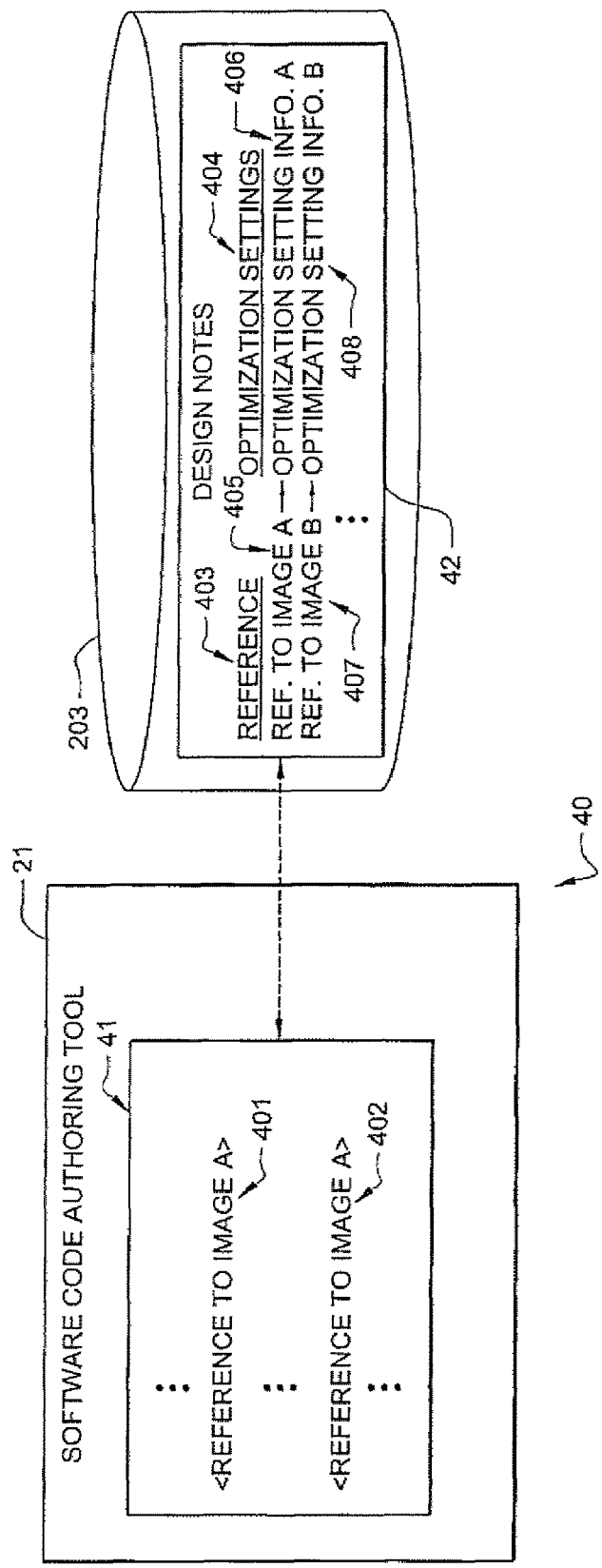
FIG. 4 shows an exemplary block diagram of one embodiment of the present invention.

An exemplary block diagram 40 of one embodiment of the present invention is shown in FIG. 4. As shown, a software code authoring tool (e.g., web authoring tool) 21 is provided with which a developer may interact to author software code 41 for an application, such as a web page. Within the code 41, references may be made to images, such as reference 401 to an image A, and reference 402 to an image B. The authoring tool 21 may maintain design notes 42 associated with the software code 41, and in such design notes 42 optimization setting information for the referenced images may be stored. For instance, design notes 42 may include information 403 identifying reference(s) to an image in the code 41, and corresponding information 404 specifying optimization settings defined for the referenced images. For instance, in the illustrated example, design notes 42 includes information 405 identifying the reference 401 in the code 41, which references image A. Design notes 42 also includes corresponding optimization setting information 406 that has been defined for the referenced image A. Similarly, design notes 42 also includes information 407 identifying the reference 402 in the code 41, which references image B. Design notes 42 also includes corresponding optimization setting information 408 that has been defined for the referenced image B. As described above, upon one of the references 401, 402 being selected in code 41 and replaced to reference a different image, authoring tool 21 may access the information contained in design notes 42 to identify the optimization settings to be applied to the newly referenced image. For instance, if reference 401 to image A in code 41 is replaced to with a new reference to a different image, image C, then authoring tool 21 may identify the optimization setting information 406 contained in design notes 42 that was previously defined for the image A referenced in the reference 401 being replaced, and authoring tool 21 may apply such optimization settings 406 to the image C referenced in the new reference in code 41.

Figure 5:
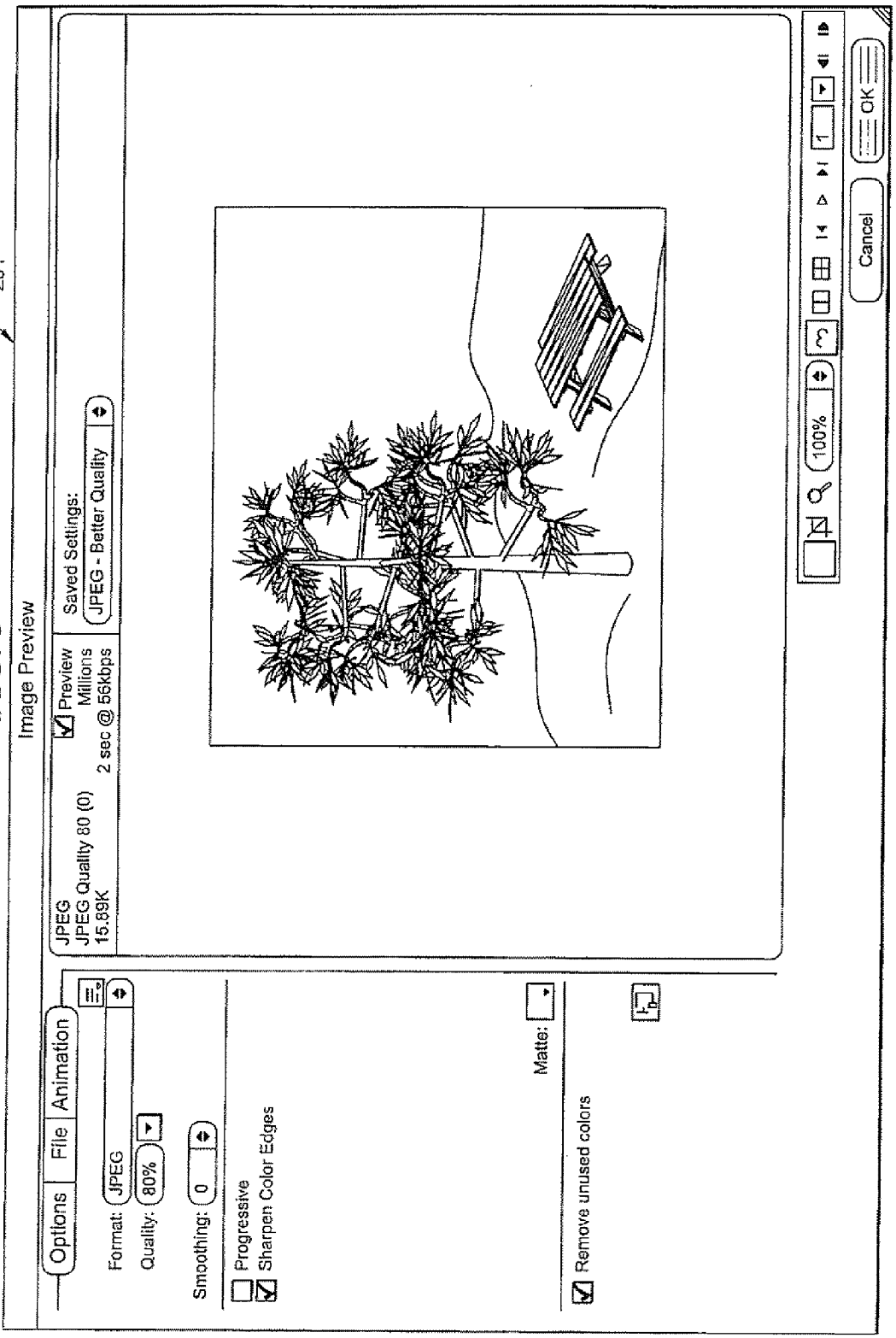
FIG. 5 shows an exemplary user interface that a software code authoring tool may provide in certain embodiments for enabling a developer to define optimization settings for a newly inserted reference to an image.

FIG. 5 shows an exemplary user interface 201 that software code authoring tool 21 may provide in certain embodiments for enabling a developer to define optimization settings for a newly inserted reference to an image, such for the inserted image 101 in the above-described example of FIG. 2A to result in optimized image 205.

Figure 6:
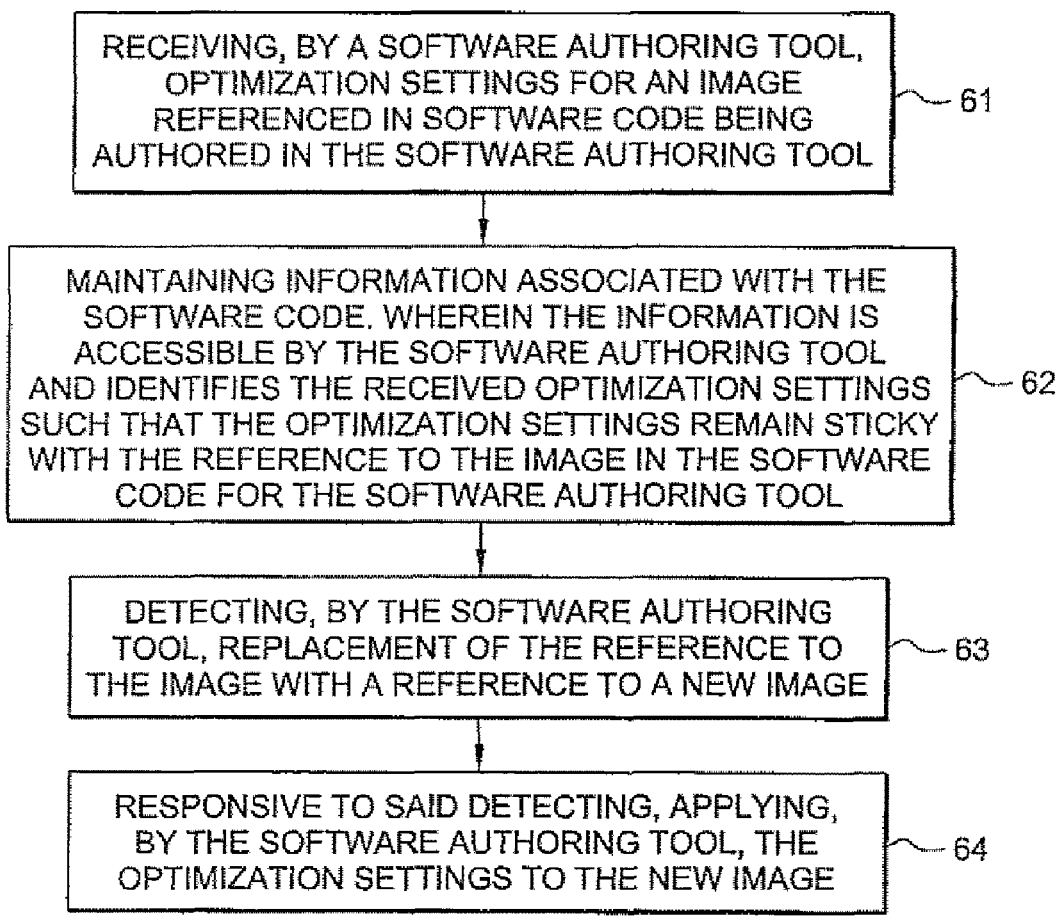
FIG. 6 shows an operational flow diagram according to one embodiment of the present invention.

Turning to FIG. 6, an operational flow diagram according to one embodiment of the present invention is shown. In operational block 61, a software code authoring tool 21 receives optimization settings for an image that is referenced in software code being authored in the software authoring tool. For instance, such optimization settings may be received for an image via a user interface 201 that is provided by authoring tool 21. Alternatively, the optimization settings may be defined through user interaction with another application, such as with an image editing application 12, and software code authoring tool 21 may receive the defined optimization settings. In block 62, information 204 is associated with the software code being authored (e.g., a web page being authored) wherein the information 204 is accessible by the software code authoring tool 21, and the information 204 identifies the received optimization settings for the image. Further, the information 204 relates the optimization settings to the reference to the image in the software code being authored. In this way, the optimization settings remain "sticky" with the reference to the image in the software code for the software authoring tool 21. That is, the software code authoring tool 21 is capable of relating the optimization settings to the reference in the software code such that if the reference is replaced with a reference to a different image, the software code authoring tool 21 may autonomously apply the optimization settings to the newly referenced image. For instance, in operational block 63, the software code authoring tool 21 detects replacement of the reference to the image with a reference to a new image. In block 64, the software code authoring tool 21 applies the optimization settings to the new image.

Figure 7:
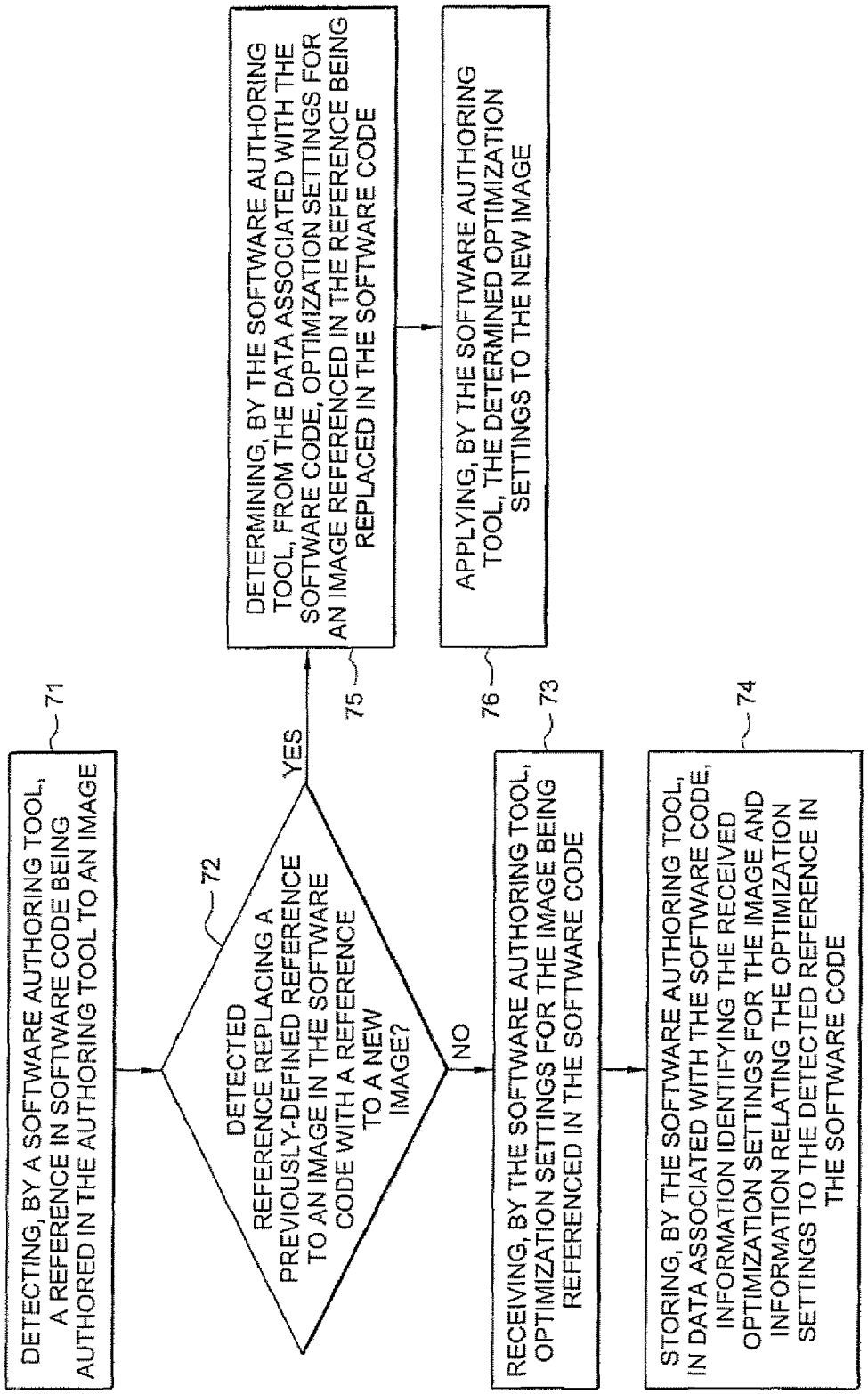
FIG. 7 shows another exemplary operational flow diagram for a software code authoring tool according to one embodiment of the present invention.

Turning to FIG. 7, another exemplary operational flow diagram is shown for a software code authoring tool 21 according to one embodiment of the present invention. In operational block 71, the software code authoring tool 21 detects a reference to an image in software code being authored. That is, software code authoring tool 21 detects an insertion into the software code being authored a new reference to an image. In block 72, software code authoring tool 21 determines whether the detected reference is replacing a previously-defined reference to an image in the software code with a reference to a new image. If determined in block 72 that the detected reference to an image is not replacing a previously-defined reference to an image in the software code being authored, operation advances to block 73 whereat the software code authoring tool 21 receives optimization settings for the image being referenced. For instance, in certain embodiments, responsive to such determination in block 72, software code authoring tool 21 may present a user interface 201 with which a developer may interact to input the desired optimization settings for the referenced image. Alternatively, the optimization settings may be defined through user interaction with another application, such as with an image editing application 12, and software code authoring tool 21 may receive the defined optimization settings (e.g., from such other application). In block 74, the software code authoring tool 21 stores in data 42 (of FIG. 4) associated with the software code being authored information identifying the received optimization settings for the image and information relating the optimization settings to the detected reference in the software code. For instance, in the example of FIG. 4, data 42 includes optimization setting information 406 for image A referenced in reference 401 in the software code being authored, along with information 405 relating such optimization settings 406 to the reference 401 in the software code.

If determined in block 72 that the detected reference to an image is replacing a previously-defined reference to an image in the software code being authored, operation advances from block 72 to block 75. In block 75, the software code authoring tool 21 determines from the data 42 optimization settings for an image referenced in the reference being replaced in the software code. For instance, in the example of FIG. 4, if the reference 401 in the software code is replaced with a reference to another image, image C, the software code authoring tool 21 may determine from data 42 the optimization settings 406 that were defined for the image A that the reference 401 being replaced referenced. In block 76, the software code authoring tool 21 applies the determined optimization settings 406 to the newly referenced image, image C. The software code authoring tool 21 may apply the optimization settings to the newly referenced image without any interaction with the developer. In certain embodiments, the software code authoring tool 21 may prompt the developer with a question regarding whether the developer desires to have the optimization settings of the image being replaced applied to the newly referenced image, and the authoring tool 21 may so apply the optimization settings to the newly referenced image responsive to the developer inputting an affirmative answer.

In view of the above, according to certain embodiments, when a copy/paste (or other insertion operation) is performed to insert a reference to an image within software code being authored in an authoring tool, such as within DREAM-WEAVER, from an image editing application, such as PHOTOSHOP, the developer is prompted with optimization settings which convert their file into an image format suitable for the software application being authored (e.g., a web page). If the developer chooses to paste over this image in the authoring tool, the same optimization settings may be automatically used again.

In many instances, developers create mockups of their web pages in an image editing application, such as in PHOTOSHOP. They take portions of these pages and copy/paste them into HTML using a web authoring tool, such as DREAMWEAVER. Each time the developer does this, they have traditionally been required to go through several steps to convert their image into a suitable, optimized format for the web (e.g., .jpg, .png, .gif, etc.). Developers often go back and forth between the image editing application (e.g., PHOTOSHOP) and the web authoring tool (e.g., DREAMWEAVER) to modify the same image. Each time the developer modifies the image, they have traditionally been required to again go through several steps to re-optimize and save the revised image for the web. Embodiments of the present invention advantageously allow developers to save their optimization settings and reuse them when they overwrite an image in the authoring tool (e.g., DREAMWEAVER) with a different image (e.g., with a modified version of the image).

Certain embodiments of the present invention saves the optimization settings for an image and re-uses them when the developer chooses to overwrite an existing image in a software code authoring tool (e.g., DREAMWEAVER) with a new image. This saves the developer several steps (e.g., inputting the optimization settings, saving the file, selecting the file within the authoring tool, and adding it to the web page being authored), thus increasing the efficiency of the developer.

Figure 8:
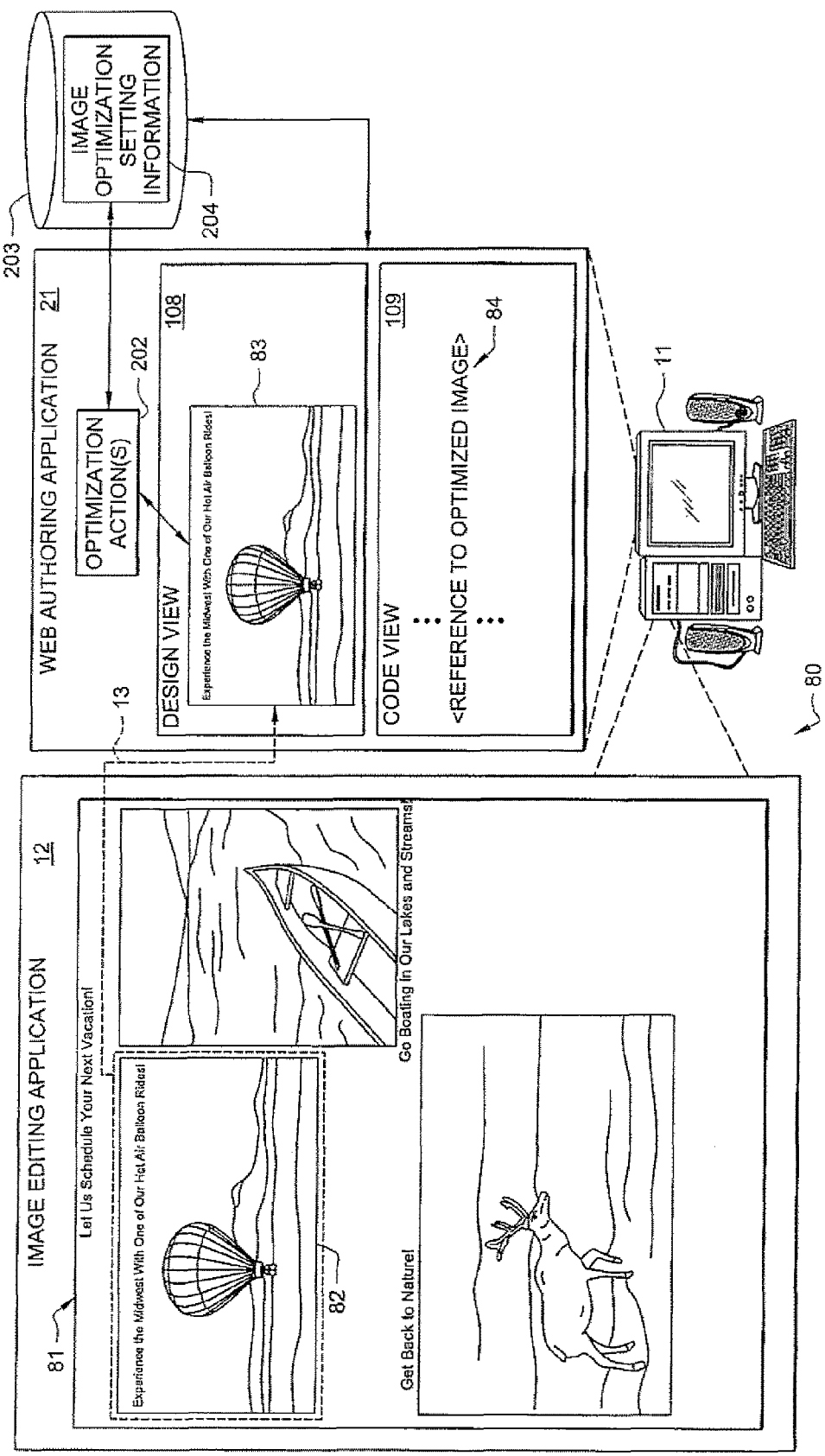
FIG. 8 shows an exemplary system according to one embodiment of the present invention.

FIG. 8 shows an exemplary system 80 according to one embodiment of the present invention. As with the above example of FIGS. 2A-2B, an image editing application 12 and a web authoring application 21 are executing on a computer system 11. Often, all or a portion of the graphical layout of a software application, such as a web page, is designed within an image editing application 12 using high-quality image(s). That is, a mock-up of the graphical layout of a software application (e.g., web page) may be created within an image editing application 12. In this example, a mock-up 81 of a web page is created in image editing application 12. For instance, high-quality image 81 may be created that shows a desired graphical layout for a web page being authored in web authoring tool 21. All or a portion of the image 81 may be selectively copied and pasted into the design view 108 of authoring tool 21 to generate a reference in the code (e.g., HTML code) of the web page to such selected portion of the image. For instance, in the illustrated example, portion 82 of image 81 is selected, copied, and pasted (via operation 13) into design view 108.

Optimization actions 202 may be performed to generate a web-optimized version of the high-quality image 82. As described above, if image 82 is pasted over a previously-defined reference to an image in the web code, the previously-defined optimization settings of the image being replaced may be determined by authoring tool 21 from information 204 (e.g., design notes) and applied to the newly referenced image 82, thereby resulting in optimized image 83. A reference 84 is generated in the code to the optimized image 83.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet), In fact, readable media can include any medium that can store or transfer information.

Figure 9:
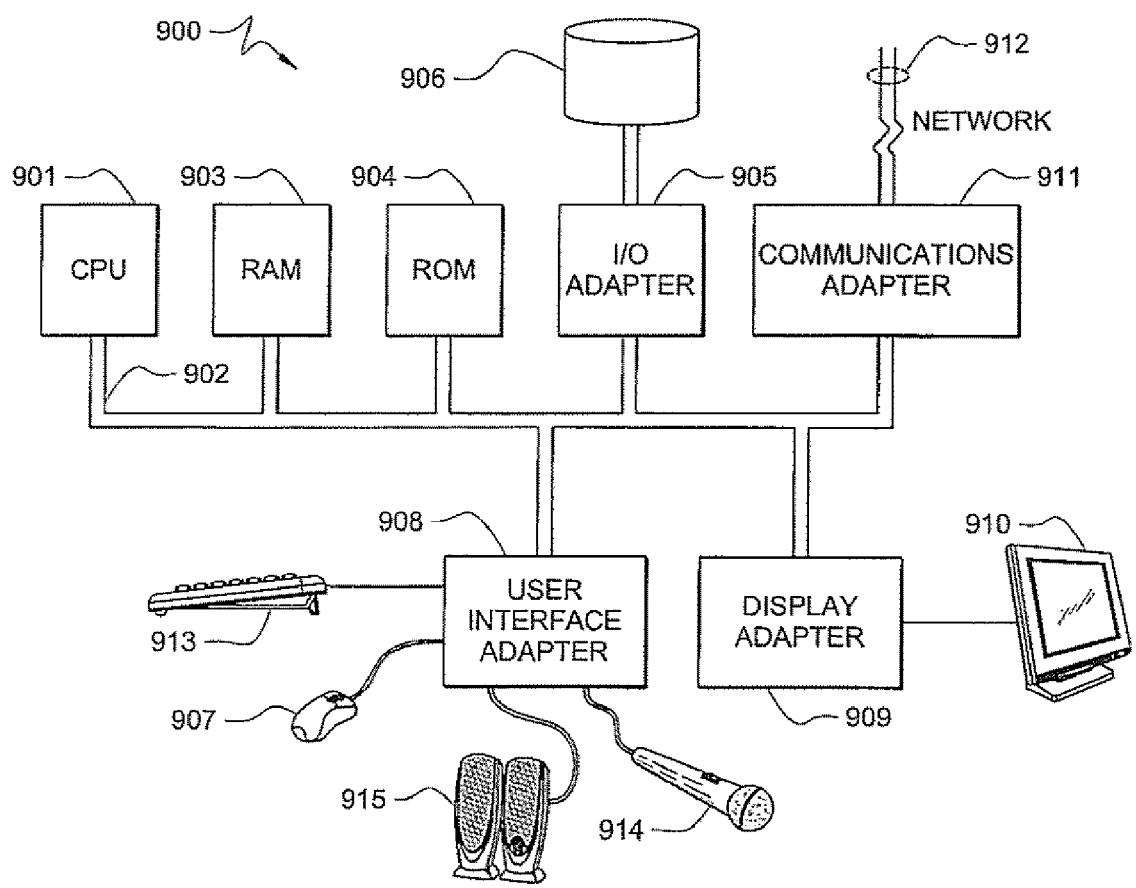
FIG. 9 shows an exemplary system on which an authoring tool may be implemented according to one embodiment of the present invention.

FIG. 9 illustrates an exemplary computer system 900 on which software code authoring tool 21 may be implemented according to one embodiment of the present invention. Central processing unit (CPU) 901 is coupled to system bus 902. CPU 901 may be any general-purpose CPU. The present invention is not restricted by the architecture of CPU 901 (or other components of exemplary system 900) as long as CPU 901 (and other components of system 900) supports the inventive operations as described herein. CPU 901 may execute the various logical instructions according to embodiments of the present invention. For example, CPU 901 may execute machine-level instructions according to the exemplary operational flows described above in conjunction with FIGS. 6 and 7.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information, such as interacting with a user interface to define desired optimization settings for an image and/or for coding a software application, as described above.

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing data for operations of the authoring tool 21. Communications adapter 911 is preferably adapted to couple computer system 900 to network 912, which may enable information to be input to and/or output from system 900 via such network 912 (e.g., the Internet or other wide-area network, a local-area network, a public or private switched telephony network, a wireless network, any combination of the foregoing). User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910 to, for example, display information pertaining to an application under development, such as code view 109, graphical-based design-time (or "display") view 108, and/or user interface 201, according to certain embodiments of the present invention.

It shall be appreciated that the present invention is not limited to the architecture of system 900. For example, any suitable processor-based device may be utilized for implementing authoring tool 21, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    detecting, by a software code authoring tool, insertion of a reference to an image in software code being authored in the software code authoring tool;
    obtaining, by the software code authoring tool, optimization settings based at least in part on whether the insertion of the reference to the image replaces a previously-defined reference to another image in the software code, wherein obtaining the optimization settings comprise:
        determining, by the software code authoring tool, that the insertion of the reference to the image replaces the previously-defined reference to the another image; and
        in response to determining that the insertion of the reference to the image replaces the previously-defined reference, retrieving, by the software code authoring tool, previously-defined optimization settings of the another image referenced by the previously-defined reference, wherein the obtained optimization settings comprise the previously-defined optimization settings;
    applying, by the software code authoring tool, the obtained optimization settings to the image; and
    storing, by the software code authoring tool and within metadata associated with the code being authored, information relating the reference to the obtained optimization settings.

2. The method of claim 1 wherein the previously-defined optimization settings of the another image referenced by the previously-defined reference are provided to the software code authoring tool through a user interface.

3. The method of claim 1 wherein the previously-defined optimization settings of the another image referenced by the previously-defined reference are obtained from an image editing application associated with the another image.

4. The method of claim 1 wherein obtaining, by the software code authoring tool, optimization settings based at least in part on whether the insertion of the reference to the image replaces a previously-defined reference to another image in the software code further comprises:
    presenting, by the software code authoring tool, an option to use the previously-defined optimization settings of the another image referenced by the previously-defined reference.

5. The method of claim 4 further comprising:
    in response to receiving, by the software code authoring tool, selection of the option to use the previously-defined optimization settings of the another image referenced by the previously-defined reference:
        including, by the software code authoring tool, the previously-defined optimization settings of the another image referenced by the previously-defined reference in the obtained optimization settings.

6. The method of claim 4 further comprising:
    in response to receiving, by the software code authoring tool, input indicating that the previously-defined optimization settings should not be used:
    presenting, by the software code authoring tool, a user interface for obtaining the optimization settings.

7. The method of claim 1 wherein applying, by the software code authoring tool, the obtained optimization settings to the image comprises:
    applying, by the software code authoring tool, the obtained optimization settings across changes to the image.

8. The method of claim 1 further comprising:
    applying, by the software code authoring tool, the obtained optimization settings to any image referenced by the reference in the software code.

9. The method of claim 1 wherein detecting, by the software code authoring tool, insertion of a reference to an image in software code being authored in the software code authoring tool comprises:
    receiving, by the software code authoring tool, the image from an image editing application.

10. The method of claim 9 wherein the image is received by the software code authoring tool from the image editing application via a paste of the image into the software code authoring tool.

11. The method of claim 1 further comprising:
    storing, by the software code authoring tool and within metadata associated with the software code being authored, the obtained optimization settings.

12. The method of claim 1 wherein the software code authoring tool comprises a web page authoring tool.

13. A system comprising:
    a memory; and
    a processor in communication with the memory, the processor configured to:
        detect insertion of a reference to an image in software code being authored in a software code authoring tool;
        obtain optimization settings based at least in part on whether the insertion of the reference to the image replaces a previously-defined reference to another image in the software code, wherein obtain optimization settings comprise:
            determine that the insertion of the reference to the image replaces the previously-defined reference to the another image; and
            in response to determining that the insertion of the reference to the image replaces the previously-defined reference, retrieve previously-defined optimization settings of the another image referenced by the previously-defined reference, wherein the obtained optimization settings comprise the previously-defined optimization settings;

apply the obtained optimization settings to the image; and store, within metadata associated with the software code being authored, information relating the reference to the optimization settings.

14. A computer-readable physical storage medium comprising program code comprising:

program code for detecting insertion of a reference to an image in software code in a software code authoring tool;

program code for obtaining optimization settings based at least in part on whether the insertion of the reference to the image replaces a previously-defined reference to another image in the software code, wherein program code for obtaining the optimization settings comprises:

program code for determining that the insertion of the reference to the image replaces the previously-defined reference to the another image; and program code for in response to determining that the insertion of the reference to the image replaces the previously-defined reference, retrieving previously-defined optimization settings of the another image referenced by the previously-defined reference, wherein the obtained optimization settings comprise the previously-defined optimization settings;

program code for applying the obtained optimization settings to the image; and program code for storing, within metadata associated with the software code being authored, information relating the reference to the optimization settings.

15. The computer-readable medium of claim 14 further comprising program code for presenting a user interface for obtaining the previously-defined optimization settings.

16. The computer-readable medium of claim 14 further comprising:

program code for determining an image editing application associated with the another image; and program code for obtaining the optimization settings from the image editing application.

17. The computer-readable medium of claim 14 wherein program code for obtaining optimization settings based at least in part on whether the insertion of the reference to the image replaces a previously-defined reference to another image in the software code further comprises:

program code for presenting an option to use the previously-defined optimization settings of the another image referenced by the previously-defined reference.

18. The computer-readable medium of claim 17 further comprising:

program code for, in response to receiving selection of the option to use the previously-defined optimization settings of the another image referenced by the previously-defined reference, including the previously-defined optimization settings of the another image referenced by the previously-defined reference in the obtained optimization settings.

19. The computer-readable medium of claim 17 further comprising:

program code for, in response to receiving input indicating that the previously-defined optimization settings should not be used, presenting a user interface for obtaining the optimization settings.

20. The computer-readable medium of claim 14 wherein program code for applying the obtained optimization settings to the image comprises:

program code for applying the obtained optimization settings across changes to the image.

21. The computer-readable medium of claim 14 wherein program code for detecting insertion of a reference to an image in software code in a software code authoring tool comprises:

program code for receiving the image from an image editing application.

22. The computer-readable medium of claim 14 further comprising:

program code for storing, within metadata associated with the software code, the obtained optimization settings.

* * * * *